United States Patent
Huang et al.

(10) Patent No.: US 11,654,934 B2
(45) Date of Patent: May 23, 2023

(54) METHODS AND SYSTEMS FOR DIVERSITY-AWARE VEHICLE MOTION PREDICTION VIA LATENT SEMANTIC SAMPLING

(71) Applicants: Toyota Research Institute, Inc., Los Altos, CA (US); Massachusetts Institute of Technology, Cambridge, MA (US)

(72) Inventors: Xin Huang, Cambridge, MA (US); Stephen G. McGill, Broomall, PA (US); Jonathan A. DeCastro, Arlington, MA (US); Brian C. Williams, Cambridge, MA (US); Luke S. Fletcher, Cambridge, MA (US); John J. Leonard, Newton, MA (US); Guy Rosman, Newton, PA (US)

(73) Assignees: TOYOTA RESEARCH INSTITUTE, INC., Los Altos, CA (US); MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 317 days.

(21) Appl. No.: 17/104,355

(22) Filed: Nov. 25, 2020

(65) Prior Publication Data
US 2021/0163038 A1  Jun. 3, 2021

Related U.S. Application Data

(60) Provisional application No. 62/941,214, filed on Nov. 27, 2019.

(51) Int. Cl.
*G06N 3/08* (2023.01)
*G06V 20/58* (2022.01)
(Continued)

(52) U.S. Cl.
CPC ...... *B60W 60/0011* (2020.02); *B60W 60/001* (2020.02); *G06F 18/2148* (2023.01);
(Continued)

(58) Field of Classification Search
CPC .......... B60W 60/0011; B60W 60/001; B60W 2420/403; G06V 20/52; G06V 20/58;
(Continued)

(56) References Cited

U.S. PATENT DOCUMENTS

2015/0026142 A1* 1/2015 Wang ................ G01C 21/20
                                                    707/693
2017/0124115 A1* 5/2017 Duan ................ G06F 16/29
(Continued)

OTHER PUBLICATIONS

Patrick Pakyan Choi, "Learning and Predicting Moving Object Trajectory: a piecewise trajectory segment approach" Aug. 2006, Robotics Institute Carnegie Mellon University (Year: 2006).*
(Continued)

*Primary Examiner* — Elaine Gort
*Assistant Examiner* — Matthias S Weisfeld
(74) *Attorney, Agent, or Firm* — Dinsmore & Shohl LLP

(57) ABSTRACT

A system and method for generating a predicted vehicle trajectory includes a generative adversarial network configured to receive a trajectory vector of a target vehicle and generate a set of latent state vectors using the received trajectory vector and an artificial neural network. The latent state vectors each comprise a high-level sub-vector, $Z_H$. The GAN enforces $Z_H$ to be correlated to an annotation coding representing semantic categories of vehicle trajectories. The GAN selects a subset, from the set of latent state vectors, using farthest point sampling and generates a predicted vehicle trajectory based on the selected subset of latent state vectors.

20 Claims, 9 Drawing Sheets

(51) Int. Cl.
  *G06V 10/82* (2022.01)
  *G06V 20/52* (2022.01)
  *B60W 60/00* (2020.01)
  *G06V 20/40* (2022.01)
  *G06F 18/214* (2023.01)
(52) U.S. Cl.
  CPC ............... *G06N 3/08* (2013.01); *G06V 10/82* (2022.01); *G06V 20/41* (2022.01); *G06V 20/52* (2022.01); *G06V 20/58* (2022.01); *B60W 2420/403* (2013.01)
(58) Field of Classification Search
  CPC .... G06V 10/82; G06V 20/41; G06F 18/2148; G06N 3/08
  USPC .......................................................... 701/23
  See application file for complete search history.

(56) References Cited

U.S. PATENT DOCUMENTS

2019/0094867 A1* 3/2019 Vernaza ................ G06N 3/047
2019/0130281 A1* 5/2019 Yang ................. G06Q 10/1053

OTHER PUBLICATIONS

Seongjin Choi, "Network-Wide Vehicle Trajectory Prediction in Urban Traffic Networks using Deep Learning" 2018, National Academy of Sciences: Transportation Research Record, vol. 2672(45) (Year: 2018).*

ByeoungDo Kim, "Probabilistic Vehicle Trajectory Prediction over Occupancy Grid Map via Recurrent Neural Network" Sep. 2017 (Year: 2017).*

Ross A. Knepper, "On the Fundamental Relationships Among Path Planning Alternatives" Jun. 2011, The Robotics Institute Carnegie Mellon University (Year: 2011).*

Mark Koren, "Efficient Autonomy Validation in Simulation with Adaptive Stress Testing" Oct. 30, 2017, 2019 IEEE Intelligent Transportation Systems Conference (ITSC) (Year: 2017).*

Carsten Moenning, "Fast Marching farthest point sampling" Apr. 2003, University of Cambridge Computer Laboratory, Technical Report No. 562 (Year: 2003).*

* cited by examiner

METHODS AND SYSTEMS FOR DIVERSITY-AWARE VEHICLE MOTION PREDICTION VIA LATENT SEMANTIC SAMPLING

CROSS-REFERENCE TO RELATED APPLICATION

This application claims the benefit of U.S. Provisional Patent Application No. 62/941,214, filed Nov. 27, 2019, entitled "METHODS AND SYSTEMS FOR DIVERSITY-AWARE VEHICLE MOTION PREDICTION VIA LATENT SEMANTIC SAMPLING", which is incorporated by reference herein in its entirety.

TECHNICAL FIELD

The present disclosure generally relates to a prediction system, computing devices, and methods carried out by the systems and devices, and more specifically, to systems, devices, and methods for predicting a trajectory of a road agent using a latent semantic space that captures semantic categories of trajectories.

BACKGROUND

Vehicle trajectory prediction may be employed for autonomous driving and advanced driver assistance systems. However, existing systems do not efficiently provide adequate diversity in their trajectory predictions. Diversity relates to coverage of the domain of possible vehicle maneuvers and allows prediction approaches to capture low-probability but high-importance outcomes. Coverage can be improved through brute force of repetition, but this approach is inefficient and makes safety verification difficult.

Diverse trajectory prediction provides coverage of possible vehicle maneuvers, which facilitates motion planning and behavior modeling for vehicles. For instance, at an intersection, sampling to produce diverse outcomes, such as left or right turns, rather than simply predicting the most likely outcome, going forward, allows for verification of safety properties. Since different maneuvers could have different outcomes, missing one of the possible maneuvers could have unintended consequences. Sampling efficiently presents a challenge because either or both of the distribution of trajectories and the definition of semantically distinct outcomes may lack an analytical form and detecting and avoiding collisions is computationally expensive.

Accordingly, a need exists for alternative systems and methods for efficiently predicting diverse vehicle trajectories.

SUMMARY

In one embodiment, a method for generating a predicted vehicle trajectory may include receiving a trajectory vector of a target vehicle and generating a set of latent state vectors using the received trajectory vector and an artificial neural network, wherein the latent state vectors each comprise a high-level representation, $Z_H$, correlated to an annotation coding representing semantic categories of vehicle trajectories. The method further includes selecting a subset, from the set of latent state vectors, using farthest point sampling, generating a predicted vehicle trajectory based on the subset of latent state vectors, and controlling a vehicle based on the predicted vehicle trajectory.

In another embodiment, the method may further include selecting the subset, from the set of latent state vectors, using farthest point sampling on the high-level representation, $Z_H$, weighting each latent state vector in the subset with a Voronoi cell weight, and generating the predicted vehicle trajectory based on the weighted subset.

In yet another embodiment, the generating of the set of latent state vectors may further include receiving a map vector comprising at least one point corresponding to a road lane, generating an intermediate vector using a first recurrent neural network on the trajectory vector and the map vector, generating a noise vector from a normal distribution, and generating a latent state vector using a linear layer neural network on the intermediate vector and the noise vector.

In yet another embodiment, the method may further include generating the predicted vehicle trajectory using a second recurrent neural network on the map vector and a weighted latent state vector in the subset.

In yet another embodiment, the latent state vectors each further include a low-level representation, $Z_L$, and the generating of the latent state vector comprises encouraging the high-level representation, $Z_H$, and the low-level representation, $Z_L$, to be uncorrelated.

In yet another embodiment, the method may further include encouraging the high-level representation, $Z_H$, to be correlated with the annotation coding such that differences between latent state vectors associated with the same annotation coding are smaller than differences between latent state vectors associated with different annotation codings.

In yet another embodiment, the encouraging of the high-level representation, $Z_H$, and the low-level representation, $Z_L$, to be uncorrelated comprises using a latent space regularization loss, and the encouraging of the high-level representation, $Z_H$, to be correlated with the annotation coding comprises using an embedding loss. The method may further include using a discriminator to generate a loss signal for the generated predicted vehicle trajectory, wherein the loss signal comprises the latent space regularization loss and the embedding loss.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Described herein are systems and methods that efficiently predict vehicle trajectories that are accurate and diverse by incorporating a latent semantic layer into the trajectory generation step. This latent semantic layer may represent an approximate space of high-level vehicle behaviors, and may match semantic distinctions between different vehicle maneuvers. Extracting this latent semantic layer does not require a complete taxonomy of maneuvers and is flexible enough to work with other definitions of semantics, such as interaction types. The latent semantic layer is designed to be low-dimensional, since a driver may be limited to performing only a few distinct maneuvers at any given moment.

Embodiments described herein use machine learning models and/or artificial neural networks to generate an intermediate vector, based on an observed trajectory. A vector may comprise N values defining a point in N-dimensional space. This intermediate vector is combined with a noise vector and transformed into a latent state vector comprising a high-level representation, $Z_H$, and a low-level representation, $Z_L$. This separation of $Z_H$ and $Z_L$ allows the methods described herein to encode high-level information, corresponding to vehicle maneuvers, in $Z_H$ and encode fine trajectory information in $Z_L$. To this end, $Z_H$ and $Z_L$ are encouraged to be uncorrelated with each other, while $Z_H$ is encouraged to be correlated with an annotation coding. The annotation coding shapes the space of $Z_H$ according to the similarity concepts or semantic concepts of vehicle maneuvers expressed in the annotation coding. By sampling from the space of $Z_H$ using farthest point sampling, a diverse set of predicted vehicle trajectories can be generated. According to some embodiments, an exponential grid may be used to generate a diverse set of predicted vehicle trajectories. This diverse set covers distinct trajectory possibilities of the target vehicle, including low probability trajectories that may still correspond to legal maneuvers. As a non-limiting example, systems and methods described herein may predict a U-turn as a distinct possibility even in driving situations where by far the most likely outcome is a left turn. This allows an autonomous vehicle to plan for both distinct maneuvers of a U-turn and a left turn. In various embodiments disclosed herein, a diverse set of low dimensional predicted trajectory samples can be efficiently enumerated without a complete taxonomy of possible maneuvers for a given driving situation.

Figure 1:
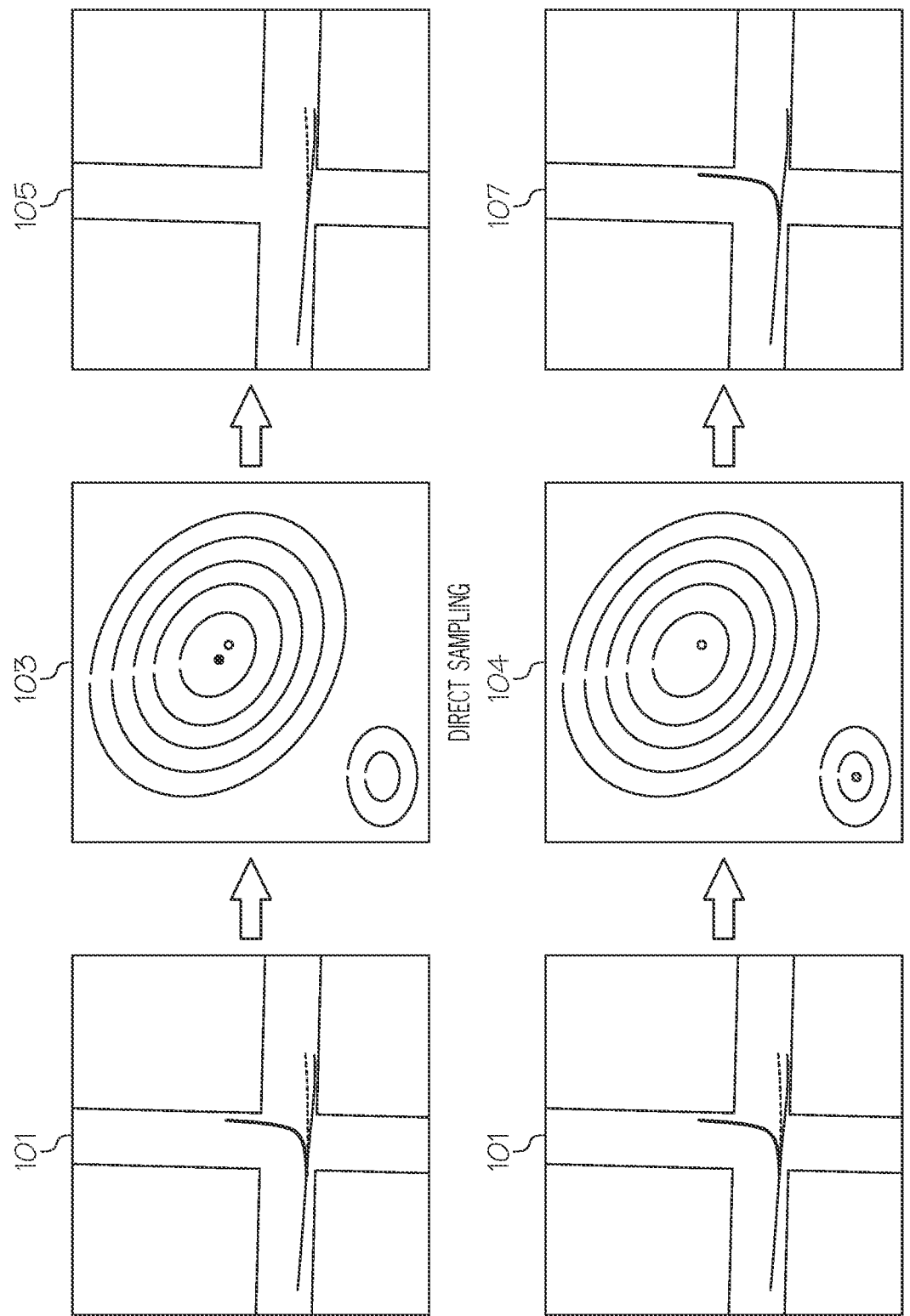
FIG. 1 depicts an illustrated comparison of direct sampling and latent semantic sampling according to one or more embodiments shown and described herein.

FIG. 1 depicts an illustrated comparison of direct sampling and latent semantic sampling according to one or more embodiments shown and described herein. FIG. 1 is presented for the purpose of illustrating the concept of latent semantic sampling only and is not intended to limit the disclosed embodiments in any way. Referring now to FIG. 1, the bottom row of panels illustrates a latent semantic sampling technique, and the top row of panels illustrates a direct sampling technique. A set of observed vehicle trajectories is illustrated on a map of an intersection in the left panel 101. A corresponding distribution of the observed trajectories is illustrated in the middle panels 103, 104. The middle panels 103, 104 illustrate a low-dimensional latent space that captures categories of vehicle maneuvers illustrated in the left panel. In the direct sampling technique, samples are taken in the latent space from the most likely outcome in the top middle panel 103. In an embodiment of latent semantic sampling, representative samples are taken in the latent space with weights that encourage more distance between samples.

As shown in the top right panel 105, the direct sampling technique predicts the most likely vehicle trajectory, which is straight through the intersection. In contrast, in the bottom right panel 107, the latent semantic sampling technique captures the possibility of a left turn in addition to the straight-through trajectory. In this way, a few samples capture relevant semantic aspects of the vehicle trajectories, while ensuring consistency with the true prediction distribution.

Figure 2:
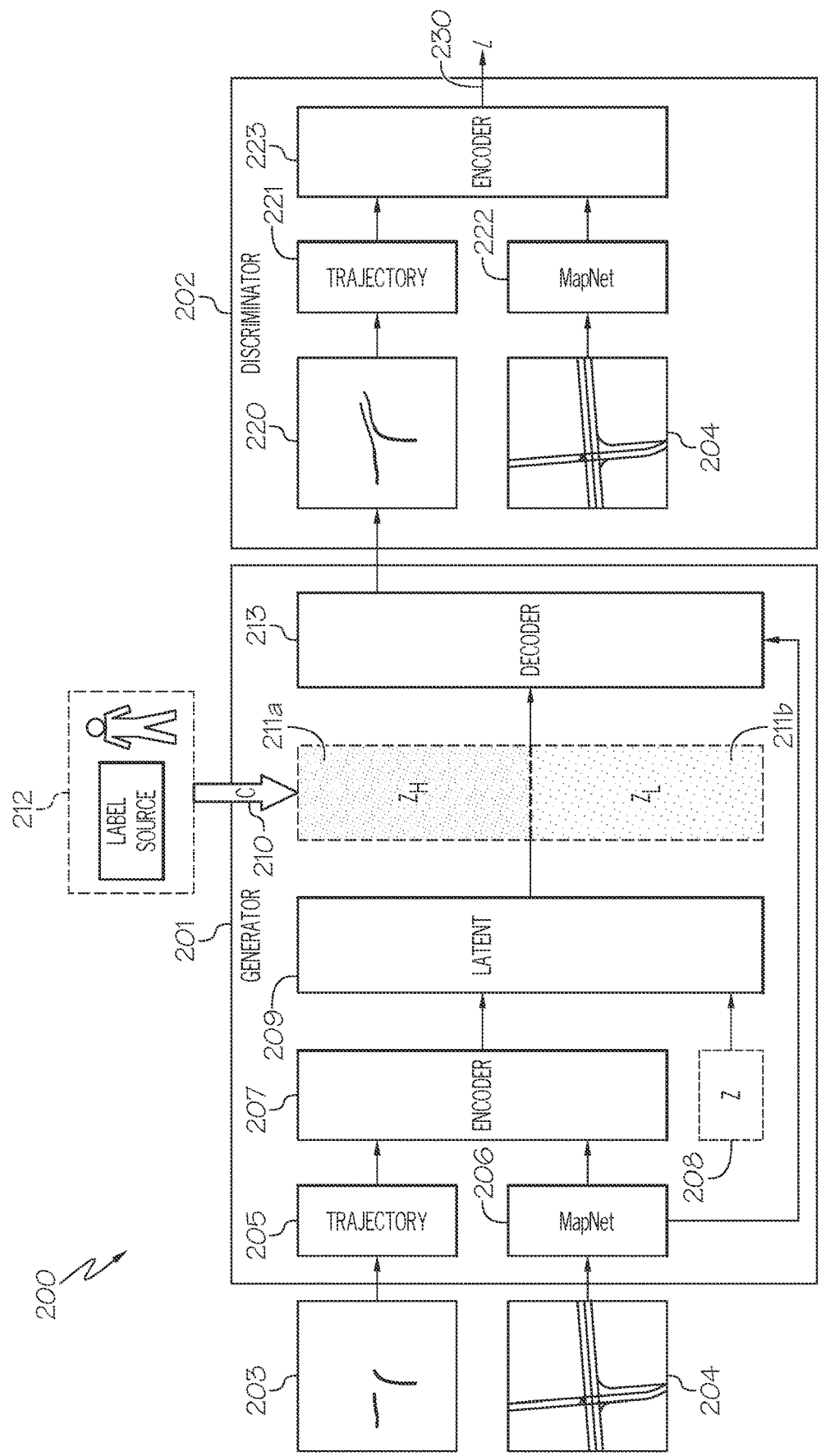
FIG. 2 depicts a block diagram of a generative adversarial network used to generate predicted vehicle trajectories using latent semantic sampling according to one or more embodiments shown and described herein.

FIG. 2 depicts a block diagram of a generative adversarial network used to generate predicted vehicle trajectories using latent semantic sampling according to one or more embodiments shown and described herein.

One or more embodiments described herein include a generative adversarial network (GAN) 200 that is trained to generate diverse vehicle trajectory predictions. The generative adversarial network 200 comprises a generator 201 and a discriminator 202. According to some embodiments, the generator 201 is configured to generate predicted vehicle trajectories based on observed vehicle trajectories 203 and map information 204. A trajectory may comprise any representation of a vehicle's location, position, speed, acceleration, and/or change in acceleration over a time frame, a sequence of positions with an implied or explicit time component, or heading and speed over the time frame, or any other method of representing vehicle trajectories. According to some embodiments, the map information 204 corresponds to the environment around the vehicle and may include lane center information. Map information 204 may also include information related to nearby vehicles, social context, or other information related to interactions between different road agents. The disclosed embodiments are compatible with different representations of vehicle trajectories and environmental information and are not necessarily limited to any particular representation of observed vehicle trajectories 203 or map information 204.

According to some embodiments, the inputs received by the generator 201 may include a sequence of observed vehicle trajectories $X=X_1, X_2, \ldots, X_{t_{obs}}$, as well as the surrounding lanes, given as their centerline coordinates, denoted as M. The predicted trajectories may include a set of predicted trajectories $\hat{Y}=\hat{Y}_{t_{obs}+1}, \hat{Y}_{t_{obs}+2}, \hat{Y}_{t_{obs}+t_{pred}}$, while the ground truth observed vehicle trajectories are denoted as $Y=Y_{t_{obs}+1}, Y_{t_{obs}+2}, \ldots, Y_{t_{obs}+t_{pred}}$. According to some embodiments, the differences between V and Y may be used in generating a loss function useful in training or evaluating the accuracy of the system. In the probabilistic setting, since multiple predicted trajectory sets could be possible, one option is to estimate the predicted probability distribution P(Y|X, M). Receiving a sequence of observed trajectories allows the generator to consider how past trajectories may affect future trajectories. Generating a set of predicted trajectories allows the generator to cover a plurality of possible trajectories a vehicle might take in a driving situation.

According to some embodiments, the discriminator 202 may be configured to evaluate vehicle trajectories and determine whether the vehicle trajectories are vehicle trajectories observed from data or predicted vehicle trajectories generated by the generator 201. The discriminator 202 is configured to minimize error in distinguishing between observed trajectories and predicted trajectories generated by the generator 201, while the generator 201 is configured to maximize the error of the discriminator 202 by generating predicted trajectories that are indistinguishable from observed trajectories. This competition of minimizing and maximizing the error between the generator 201 and discriminator 202 may be used to train the generator to generate realistic trajectory predictions. According to some embodiments, the output of the discriminator 202 may be used in determining a standard binary cross entropy loss. This loss may be used to encourage accuracy in predicted vehicle trajectories.

According to some embodiments, the generator may comprise a trajectory network 205 and a map network 206. The trajectory network 205 may be configured to receive the observed vehicle trajectory 203 and encode the observed vehicle trajectory 203 in a trajectory vector. A vector may comprise N values defining a point in an N-dimensional space. The map network 206 may be configured to receive map information 204 and encode the map information 204 in a map vector. According to some embodiments, the generator 201 may be configured to receive the observed vehicle trajectory 203 already encoded as a trajectory vector or receive the map information 204 already encoded as a map vector.

According to some embodiments, the trajectory network 205 comprises an artificial neural network of one or more linear layers. Linear layers of the trajectory network 205 may be stacked linear layers. According to some embodiments, the trajectory network 205 comprises two stacked linear layers with (32, 32) neurons. Those of ordinary skill in the art will understand that other linear layer configurations are possible without departing from the spirit of the disclosed embodiments.

According to some embodiments, the map network 206 comprises an artificial neural network of one or more linear layers. Linear layers of the map network 206 may be stacked linear layers. According to some embodiments, the map network 206 comprises four stacked linear layers with (64, 32, 16, 32) neurons. Those of ordinary skill in the art will understand that other linear layer configurations are possible without departing from the spirit of the disclosed embodiments.

According to some embodiments, the generator 201 may comprise an encoder 207. The encoder 207 is configured to receive the trajectory vector and the map vector and generate an intermediate vector based on the trajectory vector and the map vector. The encoder 207 is configured to encode the trajectory vector, the map vector, and the trajectory vectors and map vectors from previous times into an intermediate vector. According to some embodiments, the output of the encoder 207 depends on a sequence of vector states as well as a current vector state and comprises a recurrent neural network (RNN). According to some embodiments, the RNN comprises a long short term memory (LSTM) network. According to some embodiments, the LSTM comprises one layer and a hidden dimension of 64. Those of ordinary skill in the art will understand that other recurrent neural network configurations are possible without departing from the spirit of the disclosed embodiments.

According to the disclosed embodiments, the generator comprises a latent network 209. The latent network 209 is configured to receive the intermediate vector, generated by the encoder 207, and a noise vector 208 and generate a latent state vector 211a, 211b using the intermediate vector and the noise vector 208, Z. The noise vector 208 may be generated as a random sample from a standard normal distribution. The noise vector 208 acts as a random seed for generating predicted trajectories that are probabilistic. A person of ordinary skill in the art will understand that other methods of introducing randomness or entropy into the generation of latent state vectors are possible without departing from the spirit and scope of the disclosed embodiments.

The latent state vector takes the form $(Z_H; Z_L)$ and comprises two sub-vectors: a vector $Z_H$ 211a that represents high level information such as maneuvers (e.g., left turn, straight, lane change), and a vector $Z_L$ 211b that represents low-level information such as fine details of vehicle motion. A sub-vector is a vector, and $d_H$ and $d_L$ describe the number of dimensions in the sub-vectors $Z_H$ and $Z_L$, respectively. $Z_H$ 211a is a member of real numbers having $d_H$ dimensions ($Z_H \in \mathbb{R}^{d_H}$) and $Z_L$ is a member of real numbers having $d_L$ dimensions ($Z_L \in \mathbb{R}^{d_L}$). According to some embodiments, $d_H \ll d_L$, i.e., the dimensionality of $Z_H$ 211a is much less than the dimensionality of $Z_L$ 211b. The lower dimensionality of $Z_H$ 211a allows for improved efficiency in sampling from the space of $Z_H$ 211a. According to some embodiments, $d_H$=2, According to some embodiments, $d_H$ is less than half of $d_L$, less than ¼ of $d_L$, less than 1/10 of $d_L$, or less than 1/20 of $d_L$.

Separating $Z_H$ 211a and $Z_L$ 211b allows for manipulation of the latent space, isolation of a latent semantic space from other information encoded in the latent space vector, and shaping of the latent semantic space to correlate with semantic information received from a label source 212. The latent semantic space is flexible enough to allow for different concepts of semantics, such as categories of vehicle maneuvers, or interactions between vehicles. The label source 212 may comprise a user interface configured to receive labels of trajectories as input from users in any manner. The label source 212 may receive human annotations of semantic categories, human annotations of similarity between vehicle maneuvers, or computational surrogates, such as classifiers. Labels may relate to maneuvers such as merging, turning or slowing down, or interaction patterns such as giving right of way or turning at a four-way-stop junction. According to some embodiments, latent semantic space is shaped with the annotation coding 210, encoding information from the label source 212, using metric learning. One method of providing an annotation coding, or precoding, is described in related U.S. application Ser. No. 16/544,129 filed on Aug. 19, 2019 and entitled Methods And Systems For Predicting A Trajectory of a Road Agent Based on an Intermediate Space.

The label source 212 may be encoded in an annotation coding 210, illustrated as c 210 in FIG. 2. In some embodiments, these labels may be Boolean or unknown values, and they may arranged into a vector c with elements $c_i \in \{-1, 1, \phi\}$, where $\phi$ denotes that $c_i$ is unknown or undefined. The latent network 209 encourages $Z_H$ 211a and $Z_L$ 211b to be uncorrelated and encourages $Z_H$ 211a to correlate with semantic labels of the annotation coding 210. This uncorrelation and correlation disentangles semantic concepts from fine trajectory details and shapes the space of $Z_H$ 211a according to the information encoded in the annotation coding 210.

According to some embodiments, the GAN 200 uses a loss signal to encourage $Z_H$ 211a and $Z_L$ 211b to be uncorrelated. According to some embodiments, the loss signal comprises a latent space regularization loss, which the GAN 200 uses to encourage the two latent space components $Z_H$ 211a and $Z_L$ 211b to be independent and normally distributed with a unit variance for each vector element. This relationship may be encouraged by adding two regularization terms, $\mathcal{L}_{ind}$ and $\mathcal{L}_{lat}$.

The independence loss $\mathcal{L}_{ind}$, according to some embodiments, enforces that the cross-covariance between the two latent vectors $Z_H$ 211a and $Z_L$ 211b remain small, encouraging $z_L$ to hold only low-level information. This may be used as regularization, even if it does not guarantee independence of the two.

$$\mathcal{L}_{ind} = (\tau_{i=1}^{d_H} \Sigma_{j=1}^{d_L} z_H^i z_L^j) \qquad (1)$$

In various embodiments, the latent loss $\mathcal{L}_{lat}$ regularizes $Z_H$ 211a and $Z_L$ 211b in terms of their mean and variance and helps to avoid degenerate solutions.

$$\mathcal{L}_{lat} = \|\Sigma_{z_H} - Id\|_F^2 + \|\mu_{z_H}\|_F^2 + \|\Sigma_{z_L} + Id\|^2 + \|\mu_{z_L}\|^2, \qquad (2)$$

where $\|\cdot\|_F^2$ denotes the Frobenius norm. According to some embodiments, a kernel density approximation may be used to estimate correlation between $Z_H$ 211a and $Z_L$ 211b. A person of ordinary skill in the art will understand that other loss functions may be used to encourage independence of $Z_H$ 211a and $Z_L$ 211b.

According to some embodiments, the GAN 200 uses the loss signal to encourage correlation between $Z_H$ 211a and the annotation coding 210. According to some embodiments, the loss signal includes an embedding loss, which the GAN 200 uses to enforce correlation between high-level latent vector $Z_H$ and annotation coding c 210. If two trajectory representations are associated with the same label l, represented in the annotation coding 210, the differences in their high-level latent vectors $Z_H$ may be expected to be small. On the other hand, if two trajectory representations have different annotation codings 210, the difference in their high-level latent vectors $Z_H$ may be expected to be large. This can be written as $$\mathcal{L}_{emb} = \Sigma_{m=1}^B \Sigma_{n=1}^B \Sigma_{l=1}^s \text{sign}(c_l^{(m)}, c_l^{(n)}) \|v^{(m)} - v^{(n)}\|_2, \qquad (3)$$

where B is batch size, $c_l^{(m)}$, $c_l^{(n)}$ denote the label l answers on examples m, n respectively, and $\text{sign}(\bullet,\bullet) = 0$ if either argument is $\phi$. According to some embodiments, a mapping from the latent space to label l or triplet loss may be used to encourage correlation between $Z_H$ 211a and the annotation coding 210. A person of ordinary skill in the art will understand that other loss functions may be used to encourage correlation between $Z_H$ 211a and the annotation coding 210.

According to some embodiments, the GAN 200 may include a decoder 213. The decoder 213 is configured to receive the latent state vector 211a, 211b and the map vector generated by the map network 206 and generate a predicted vehicle trajectory 220 based on the latent state vector 211a, 211b and the map vector. The predicted vehicle trajectory 220 may be used by an autonomous vehicle system for planning and evaluating safety.

According to some embodiments, the decoder 213 is configured to generate a sequence of vehicle positions based on the latent state vector 211a, 211b and the map vector. Because the output of the decoder 213 includes a sequential component, according to some embodiments, the decoder 213 may comprise a recurrent neural network (RNN). According to some embodiments, the decoder 213 may comprise the same artificial neural network structure as the encoder 207. According to some embodiments, the RNN of the decoder 213 comprises a long short term memory (LSTM) network. According to some embodiments, the LSTM of the decoder 213 comprises one layer and a hidden dimension of 64. Those of ordinary skill in the art will understand that other recurrent neural network configurations are possible without departing from the spirit of the disclosed embodiments.

According to an embodiment, the discriminator 202 is configured to evaluate vehicle trajectories and determine whether the vehicle trajectories are vehicle trajectories observed from data or vehicle trajectories generated by the generator 201. A vehicle trajectory evaluated by the discriminator 202 may comprise a combination of observed vehicle trajectories or a combination of an observed vehicle trajectory and a predicted vehicle trajectory 220 generated by the generator 201. The discriminator 202 may be configured to generate a label 230 for each evaluated vehicle trajectory. The label may comprise a TRUE or FALSE value, a FAKE or REAL value or any value to differentiate between observed vehicle trajectories and predicted trajectories generated by the generator 201. The output of the discriminator 202 may be used in training the generator 201 to generate realistic predicted trajectories.

According to some embodiments, the discriminator 202 may comprise a trajectory network 221 and a map network 222. According to some embodiments, the trajectory network 221 of the discriminator 202 comprises the same artificial neural network structure as the trajectory network 205 of the generator 201. Likewise, the map network 222 may comprise the same artificial neural network structure as the map network 206 of the generator 201.

The discriminator 202 may also comprise an encoder 223, configured to convert vehicle trajectories and map information 204 into a label L={fake, real}, where "fake" means a trajectory is generated by the predictor, while "real" means the trajectory is from data. According to some embodiments, the structure of the encoder 223 mirrors that of the generator's 201 encoder 207, except in its output dimensionality. The encoder 223 of the discriminator 202 may include an LSTM with the same structure as the generator's 201 encoder 207, followed by a series of stacked linear layers with dimensions of (64, 16, 1), activated by a sigmoid layer at the end. A person of ordinary skill in the art will understand that other artificial neural network structures may be used without departing from the spirit and scope of the disclosed embodiments.

According to some embodiments, some or all linear layers in the generator 201 may be followed by batch normalization, rectified linear unit (ReLU), and dropout layers. According to some embodiments, some or all linear layers in the discriminator 202 may use a leaky ReLU activation. Batch normalization, ReLU, leakyReLU, and dropout layer are terms that are well known in the art.

Figure 3:
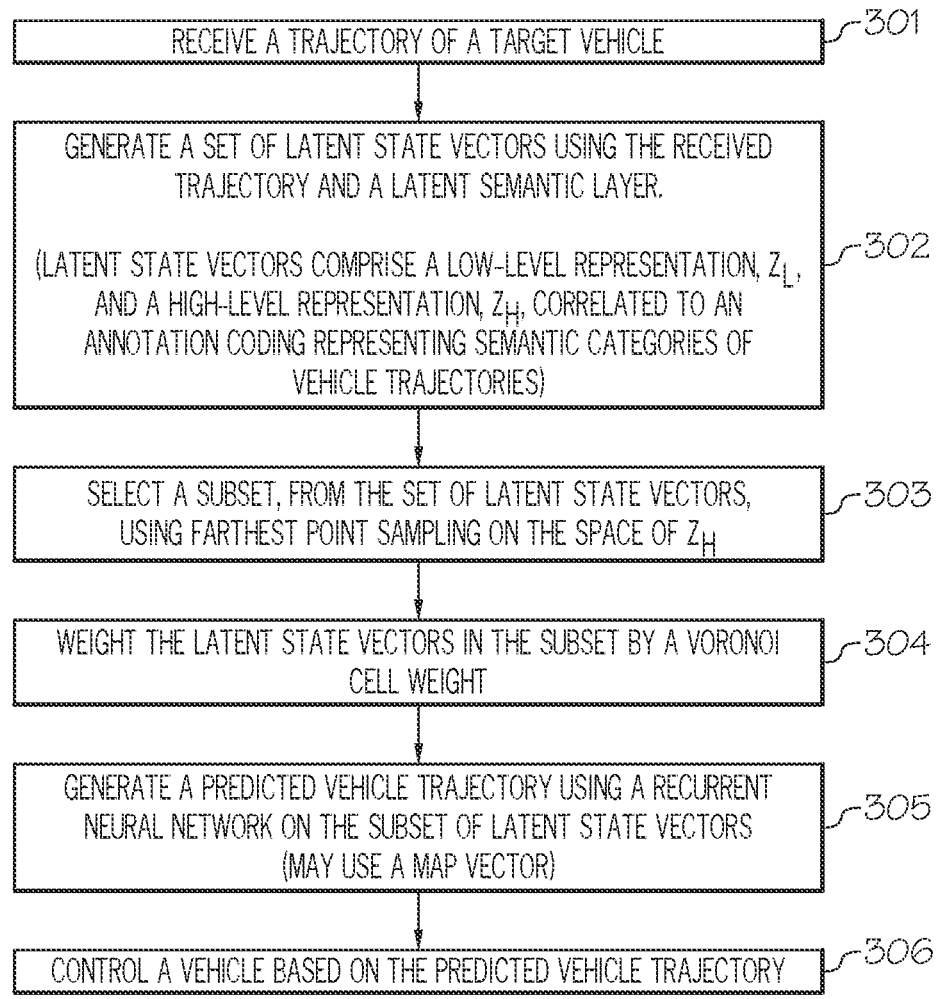
FIG. 3 depicts a flowchart of a method for generating a predicted vehicle trajectory according to one or more embodiments shown and described herein.

FIG. 3 depicts a flowchart of a method for generating a predicted vehicle trajectory according to one or more embodiments shown and described herein. As machine learning is inherently tied to computer systems, the flowchart steps may be performed by a computing device, as described herein. As a non-limiting example, some of the steps of FIG. 3 may be performed using a generative adversarial network (GAN), as described in FIG. 2.

At step 301, the GAN 200 receives a trajectory of a target vehicle. The trajectory may be represented using any method described herein. The trajectory may be an observed trajectory of an ego vehicle or a nearby vehicle. The trajectory may be an observed trajectory observed in real-time using sensors, or an observed trajectory from a data set of observed vehicle trajectories. At step 302, the GAN generates a set of latent state vectors using the received trajectory and a latent network. A latent state vector may comprise a low-level representation, $Z_L$, and a high-level representation, $Z_H$, correlated to an annotation coding 210 representing semantic categories of vehicle trajectories. Each latent state vector in the set may be generated based on a different noise vector 208 and may correspond to a predicted trajectory that is possible based on the observed trajectory 203 and map information 204.

The set of latent state vectors is generated in order to provide a vector set from which the GAN 200 may sample in order to generate a diverse set of possible predicted vehicle trajectories. In a given driving situation, there may be a plurality of possible trajectories that could follow an observed trajectory. As a non-limiting example, a straight trajectory may be followed by continuing straight, turning left, or changing lanes. Different driving situations may allow for different sets of possible future trajectories, given an observed trajectory. The GAN 200 may differentiate between different driving situations, based on one or more of a different sequence of observed trajectories preceding a current observed trajectory 203 or different map information 204, and generate different sets of latent state vectors for different driving situations.

At step 303, the GAN 200 may select a subset, from the set of latent state vectors, using farthest point sampling (FPS) on the space of $Z_H$. Because the latent space of $Z_H$ is shaped by the annotation coding 210 (i.e., $Z_H$ is encouraged to be correlated with the annotation coding 210), the latent space of $Z_H$ provides a definition of similarity for trajectories. The annotation coding 210 may shape the space of $Z_H$ to be lumpy, such that trajectories sharing the same semantic label may have a smaller distance from each other in the space of $Z_H$, while trajectories with different semantic labels may have a larger distance from each other in the space of $Z_H$. Thus, trajectories that may be difficult to categorize based on $Z_L$ may be categorizable in the lumpy space of $Z_H$. Even without an explicit semantic label, a semantic category for a given trajectory (or corresponding latent state vector) may be inferred based on distance to other explicitly labeled trajectories in the latent space of $Z_H$. Further, no complete taxonomy of semantic categories is necessary, as trajectories may be lumped into groups in the space of $Z_H$ based on similarity defined by the annotation coding 210.

Using farthest point sampling on the lumpy space of $Z_H$ helps to ensure that a diverse set of predictions can be generated for an observed trajectory. FPS avoids predicting only the most likely trajectory, which avoids missing high-importance, low probability vehicle maneuvers. According to some embodiments, FPS encourages diverse sampling by weighting each sample based on a Voronoi cell weight. At step 304, the GAN 200 may weight the latent state vectors in the subset by a Voronoi cell weight.

At step 305, the GAN 200 generates one or more trajectories based on the selected subset of latent state vectors. A plurality of predicted trajectories based on the selected subset may provide an autonomous vehicle system with identification of diverse trajectories covering different vehicle maneuvers, including maneuvers that are unlikely but still legal and useful for planning and safety verification purposes. The GAN may use a map vector, based on the map information 204, in generating a predicted vehicle trajectory based on the selected subset of latent state vectors. According to some embodiments, the GAN may use the decoder 213 on the subset of latent state vectors in generating one or more predicted vehicle trajectories.

At step 306, an autonomous vehicle system may control a vehicle based on the predicted vehicle trajectory. The autonomous vehicle system may use the one or more predicted vehicle trajectories in planning and safety verification. Because the predicted trajectories cover distinct possibilities of vehicle maneuvers using a small number of samples, the autonomous vehicle may more efficiently evaluate safety and plan for realistic outcomes that are nevertheless low probability. Latent semantic sampling helps to prevent an autonomous vehicle system from assuming that a vehicle will take the most likely trajectory, which improves prediction accuracy and safety evaluation.

Figure 4:
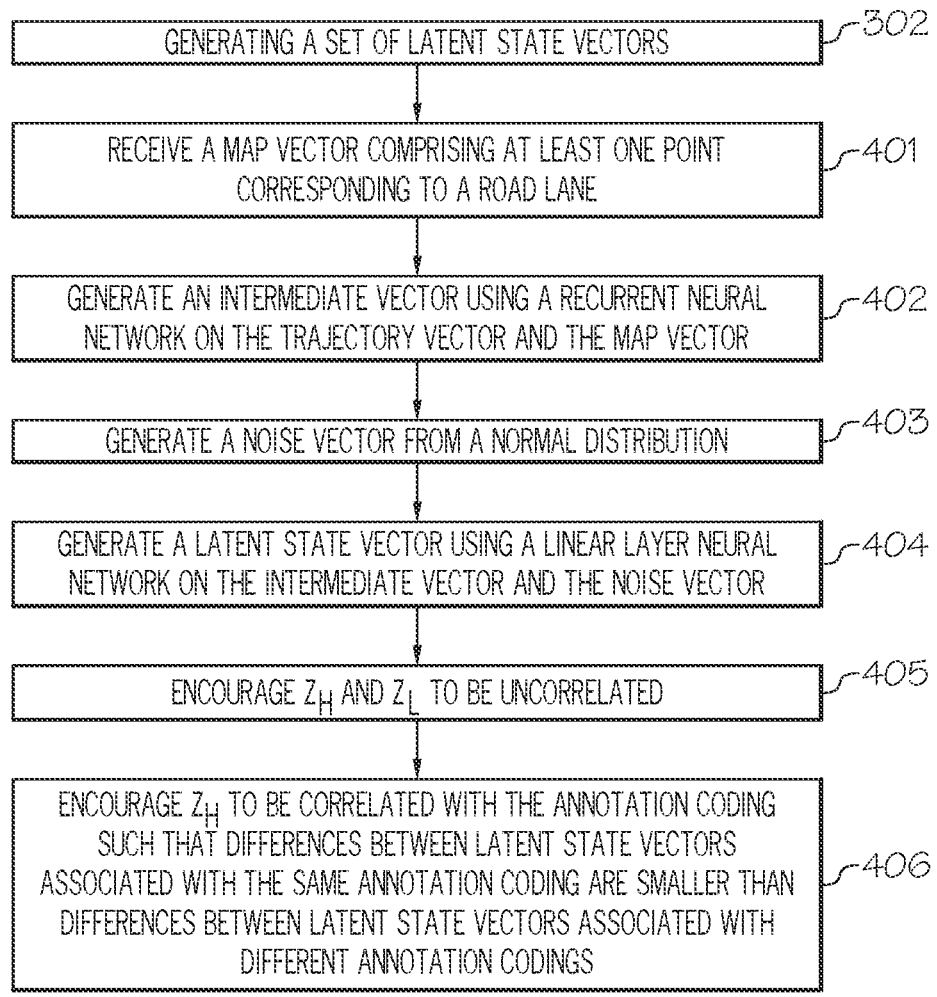
FIG. 4 depicts a flowchart of a method for generating a set of latent state vectors used in generating a predicted vehicle trajectory according to one or more embodiments shown and described herein.

FIG. 4 depicts a flowchart of a method for generating a set of latent state vectors used in generating a predicted vehicle trajectory according to one or more embodiments shown and described herein. According to some embodiments, generating the set of latent state vectors, as shown at step 302 in FIG. 3, may include the steps illustrated in FIG. 4. The flowchart steps of FIG. 4 may be performed by a computing device as described herein. As a non-limiting example, the steps of FIG. 4 may be performed using a generative adversarial network (GAN), as described in FIG. 2.

At step 401, the GAN 200 may receive a map vector comprising at least one point corresponding to a road lane. As discussed, the map vector may be generated based on map information 204, using a map network 206, and may include information related to an environment around the vehicle. According to some embodiments, the map vector may include lane center information.

At step 402, the GAN 200 may generate an intermediate vector based on the trajectory vector and the map vector. As discussed, the GAN may use a recurrent neural network to encode a sequence of trajectory vectors, including the trajectory vector received at step 301, into the intermediate vector. According to some embodiments, the intermediate vector may include information corresponding to both the observed trajectory and the environment of the vehicle, such as intersection information.

At step 403, the GAN 200 may generate a noise vector 208 from a normal distribution. The noise vector 208 introduces entropy into the trajectory prediction process, and encourages diversity by randomizing the trajectory predicted within the space of $(Z_H; Z_L)$. Each latent state vector in the set generated in step 302 may be generated based on a different noise vector 208.

At step 404, the GAN 200 may generate a latent state vector based on the intermediate vector and the noise vector 208. The latent state vector comprises two component sub-vectors: a vector $Z_H$ 211a that represents high level information such as maneuvers (e.g., left turn, straight, lane change), and a vector $Z_L$ 211b that represents low-level information such as fine details of vehicle motion. According to some embodiments, the GAN 200 may generate the latent state vector using a linear layer neural network on the intermediate vector and the noise vector 208.

At step 405, the GAN encourages $Z_H$ and $Z_L$ to be uncorrelated. This ensures that the semantic information encoded in $Z_H$ does not overlap between the two sub-vectors of the latent state vector. This allows $Z_H$ to capture semantic information represented in the annotation coding 210, while shifting other information into $Z_L$. According to some embodiments, the GAN uses a latent space regularization loss to encourage independence of $Z_H$ and $Z_L$. The latent space regularization loss may include an independence loss $\mathcal{L}_{ind}$, and/or a latent loss $\mathcal{L}_{lat}$, as described herein. A person of ordinary skill in the art will understand that other loss functions could be used to encourage independence of $Z_H$ and $Z_L$.

At step 406, the GAN may encourage $Z_H$ to be correlated with the annotation coding 210 such that differences between latent state vectors associated with the same annotation coding 210 are smaller than differences between latent state vectors associated with different annotation codings 210. The GAN 200 may use the annotation coding 210 to encourage the latent state sub-vector $Z_H$ to correlate with a definition of similarity encoded in the annotation coding 210. The annotation coding 210 may comprise an encoding of annotations of a label source 212. The label source 212 is not required to follow any particular definition of semantics or semantic categories related to vehicle maneuvers. The annotation coding 210 provides a definition for similarity based on distance in the space of $Z_H$.

As a non-limiting example, the label source can include maneuvers, such as merging, turning, or slowing down, or interaction patterns such as yielding a right-of-way or turning at a four-way-stop. According to some embodiments, maneuvers of the label source 212 may be encoded in the annotation coding 210 with specific maneuvers, yielding three-value logic (True/False/"undefined") values. The three-value logic may be encoded in the annotation coding 210 into a vector c with elements $c_i \in \{-1, 1, \phi\}$, where $\phi$ denotes that $c_i$ is unknown or undefined. Three-value logic may be useful in instances where a semantic category doesn't always apply. For example, a "lane keep" semantic category may be inapplicable in an open road without lane markers. This type of representation avoids a single taxonomy of all road situations with definite semantic values.

By generating multiple latent state vectors ($Z_H$; $Z_L$) using different noise vectors with the intermediate vector, and encouraging independence of $Z_H$ and $Z_L$, while using the annotation coding 210 to shape the space of $Z_H$ according to semantic concepts of the label source 212, the GAN 200 generates multiple predicted vehicle trajectories that cover semantically distinct categories of vehicle maneuvers. Semantic distinctness is defined by the encoding of the label source 212 into the annotation coding 210, such that distance in the space of $Z_H$ can represent similarity, i.e., similarity increases as distance decreases. Distance may be computed using Euclidian distance within the space of $Z_H$.

Figure 5:
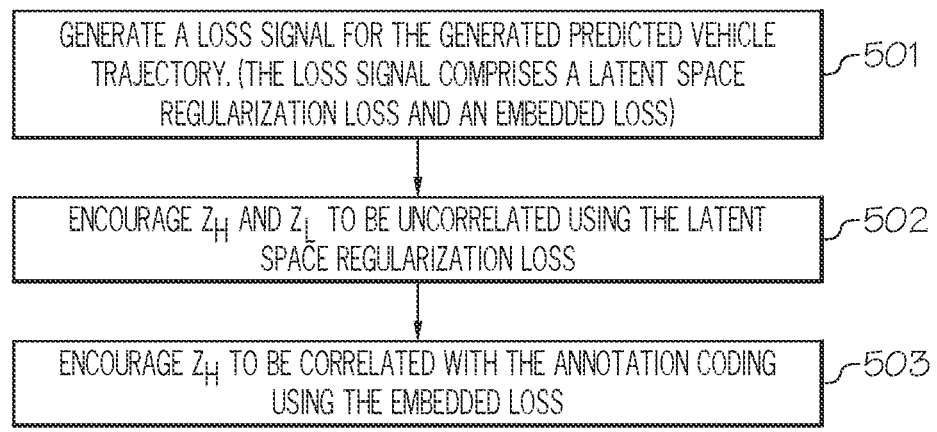
FIG. 5 depicts a flowchart of a method for using a loss signal in generating a predicted vehicle trajectory according to one or more embodiments shown and described herein.

FIG. 5 depicts a flowchart for using a loss signal in generating a predicted vehicle trajectory according to one or more embodiments shown and described herein. There are a plurality of sources of information that may be used in generating a loss signal useful in the GAN 200 described herein. As discussed, the discriminator 202 may categorize received trajectories with a label L={fake, real}. Real trajectories are those observed in data, and fake trajectories are those generated by the generator 201. The label L applied by the discriminator may be used in generating an adversarial loss based on a standard binary cross entropy loss. Further, additional loss signals may be generated based on differences between a predicted trajectory and an actual observed trajectory over a time frame of the predicted trajectory. Other losses, such as the latent space regularization loss may be generated based on relationships enforced between vectors generated in the GAN 200.

At step 501, the GAN 200 may generate a loss signal for the generated predicted vehicle trajectory. According to some embodiments, the loss signal may comprise, among other loss signals, a latent space regularization loss and an embedding loss. The latent space regularization loss may be based on two regularization terms, an independence loss, $\mathcal{L}_{ind}$, described in equation (1) and a latent loss, $\mathcal{L}_{lat}$, described in equation (2). The independence loss, $\mathcal{L}_{ind}$, enforces the cross-covariance between $Z_H$ 211a and $Z_L$ 211b to remain small and the latent loss, $\mathcal{L}_{lat}$, regularizes $Z_H$ 211a and $Z_L$ 211b in terms of their mean and. The embedding loss, $\mathcal{L}_{emb}$, is defined in equation (3) and enforces correlation between $Z_H$ and the annotation coding 210.

At step 502, the GAN 200 may encourage $Z_H$ and $Z_L$ to be uncorrelated using the latent space regularization loss. At step 503, the GAN 200 may encourage $Z_H$ to be correlated with the annotation coding using the embedding loss. Given the description of the latent state vector, a person of ordinary skill in the art would understand the other loss functions may be used to enforce independence of $Z_H$ and $Z_L$ and correlation between $Z_H$ and the annotation coding 210.

Other loss functions may also be useful in training or using the systems and methods disclosed herein. Performance of the GAN 200 may be measured using the average displacement error (ADE) of Equation 4 or the final displacement error (FDE) of Equation 5.

$$\mathcal{L}_{ADE}(\hat{Y}) = \frac{1}{t_{pred}} \sum_{t=t_{obs}+1}^{t_{obs}+t_{pred}} \| Y_t - \hat{Y}_t \|_2 \qquad (4)$$

$$\mathcal{L}_{FDE}(\hat{Y}) = \| Y_{t_{obs}+t_{pred}} - \hat{Y}_{t_{obs}+t_{pred}} \|_2 \qquad (5)$$

Losses may also be computed relative to the best prediction in the set of generated predictions. The best prediction may be the prediction, in a set of predicted trajectories, with the lowest loss compared to an observed trajectory corresponding to a time frame of the predicted trajectory. A Minimum over N (MoN) loss may be computed to encourage the model to cover ground truth options while maintaining diversity in its predictions:

$$\mathcal{L}_{MoN} = \min_n \left( \mathcal{L}_{ADE}(\hat{Y}^{(n)}) \right), \qquad (6)$$

where $\hat{Y}^{(1)}, \ldots, \hat{Y}^{(N)}$ are predicted vehicle trajectories generated by the GAN 200. The loss, over N samples from the generator 201, may be computed as the average distance between the best predicted vehicle trajectories and corresponding observed trajectories. Although minimizing MoN loss may lead to a diluted probability density function compared to the ground truth, MoN can be used to show that the disclosed methods can generate distribution of predicted trajectories efficiently.

The losses listed above may be combined together in a combined loss with appropriate coefficients. The coefficients may be adjusted dynamically during training.

$$\mathcal{L},_D = \mathcal{L}_{GAN,D} \qquad (7)$$

$$\mathcal{L},_G = \lambda_1 \mathcal{L}_{MoN} + \lambda_2 \mathcal{L}_{GAN,G} + \lambda_3 \mathcal{L}_{ind} + \lambda_4 \mathcal{L}_{lat} + \lambda_5 \mathcal{L}_{emb} \qquad (8)$$

Figure 6:
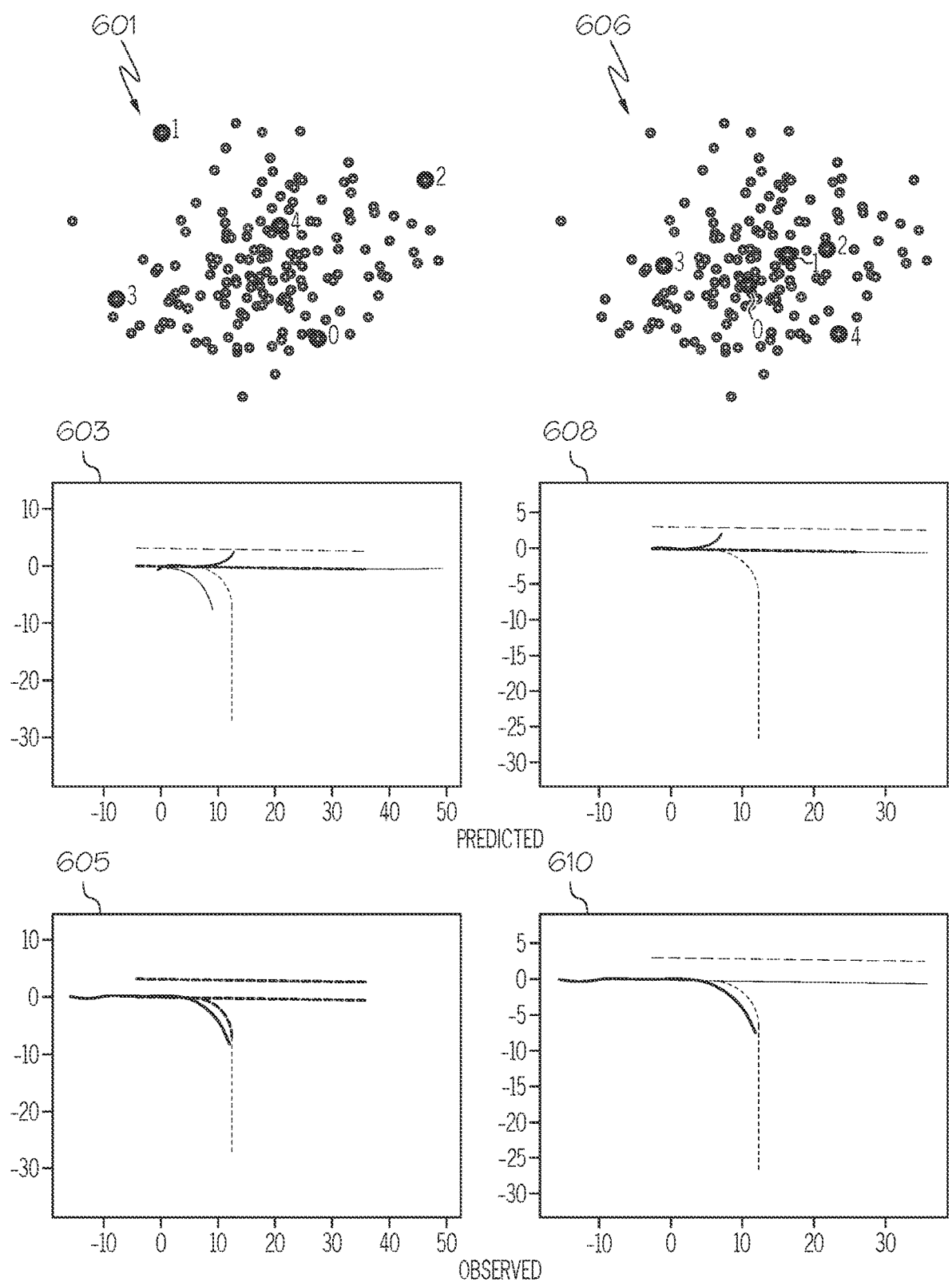
FIG. 6 depicts an illustration of sampling vehicle trajectories from a distribution space and the corresponding trajectories overlaid on a lane center map of an intersection for both direct sampling and farthest point sampling according to one or more embodiments shown and described herein.

FIG. 6 depicts an illustration of sampling vehicle trajectories from a distribution space and the corresponding trajectories overlaid on a lane center map of an intersection for both direct sampling and farthest point sampling according to one or more embodiments shown and described herein.

At the top portion of FIG. 6, two scatter plots 601, 606 are shown. These scatter plots 601, 606 illustrate a non-limiting example of a set of predicted vehicle trajectories represented in a 2-dimensional space for illustration purposes only. According to some embodiments, the 2-dimensional space of the scatter plots 601, 606 may correspond to the latent space of the latent state sub-vector $Z_H$. However, other interpretations are possible, and FIG. 6 is presented only to illustrate a comparison between farthest point sampling (FPS) and direct sampling. In FIG. 6, the panels on the left 601, 603, 605 correspond to FPS, and the panels on the right 606, 608, 610 correspond to direct sampling. In the middle panels 603, 608 and bottom panels 605, 610 vehicle trajectories are represented on map diagrams. In the maps 603, 605, 608, 610, lane center lines are represented with dashed lines.

In both scatter plots 601, five samples [0, 1, 2, 3, 4] are taken from the distribution of predicted trajectories. In the left scatter plot 601, because FPS is used to sample from the distribution of predicted trajectories, the distance between the samples is larger than in the right scatter plot 606 where direct sampling is used. This distance between samples translates into greater diversity of predictions, as discussed below.

In the middle panels, 603, 608, directly above the "Predicted" label, representations of the predicted trajectories, sampled in the top panels 601, 606 are drawn on the maps 603, 608. As illustrated in the left middle map 603, corresponding to FPS, three distinct trajectories are represented in the five samples. Sample 0 represents a lane change, sample 1 represents going straight, and sample 2 represents a right turn. Samples 3 and 4 appear to be trajectories that are nearly identical to sample 1. In contrast, in the right middle map 608, corresponding to direct sampling, only two distinct trajectories are represented by the five samples. Sample 0 is shown as a straight trajectory on the map 608, and sample 4 seems to capture the lane change trajectory. However, samples 1, 2, and 3 appear to be nearly identical to the trajectory already covered by sample 0.

In the bottom maps 605, 610, directly above the "Observed" label, representations of an observed trajectory are drawn on maps. The observed trajectories represented in the maps 605, 610 represent an actual trajectory observed in a time frame for which the predicted trajectories, shown in the scatter plots 601, 603, were generated. As shown, the trajectory observed for the time frame of the predictions was a right turn. This right turn was successfully predicted using FPS 601, 603, but missed by direct sampling 606, 608.

FPS illustrated in the left middle map 603 captures the three categories of trajectories that are possible, given the lane center lines illustrated in the maps 603, 608. By capturing the possibility of a right turn, an autonomous vehicle system using systems and methods disclosed herein may provide improved coverage of the different trajectories possible in a given driving situation.

In contrast, by sampling from predicted trajectories in a way that allows minimal distance between samples, as shown in the top right scatter plot 606 corresponding to direct sampling, some trajectories are represented multiple times while others are missed, as illustrated in the middle right map 608. This can lead to excessive processing dedicated to planning and safety evaluation for the straight trajectory, while failing to plan for or evaluate safety of the right turn.

Figure 7A:
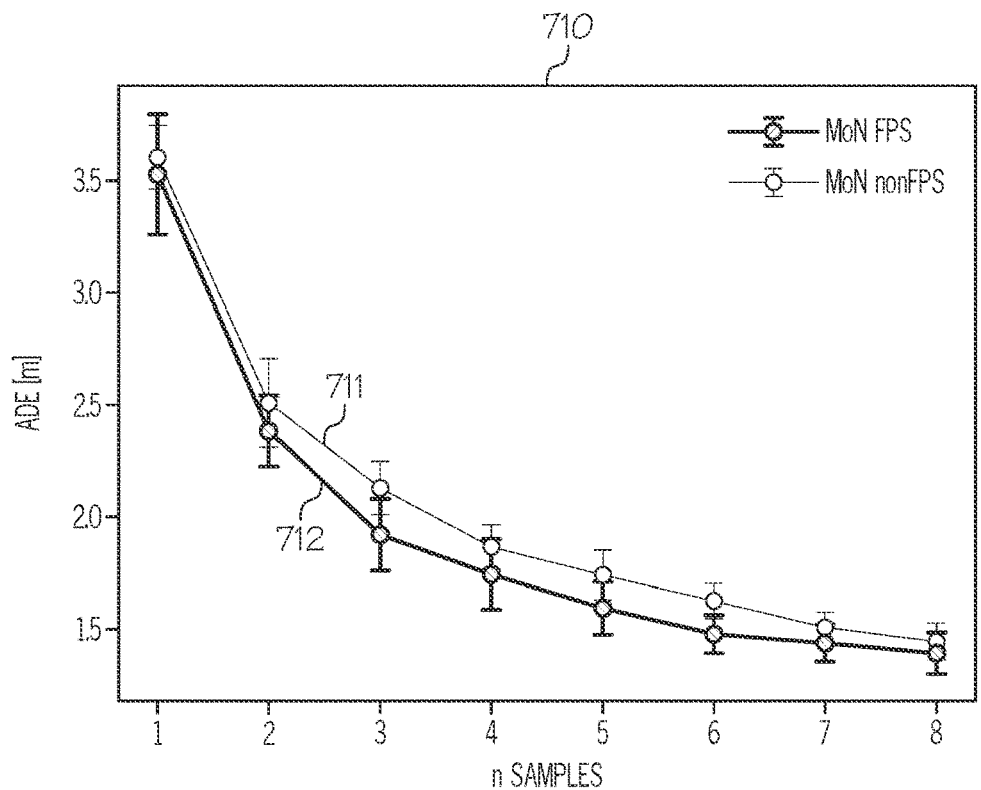
FIGS. 7A and 7B depict graphs showing accuracy and coverage of predicted vehicle trajectories generated by systems and methods according to one or more embodiments shown and described herein.
Figure 7B:
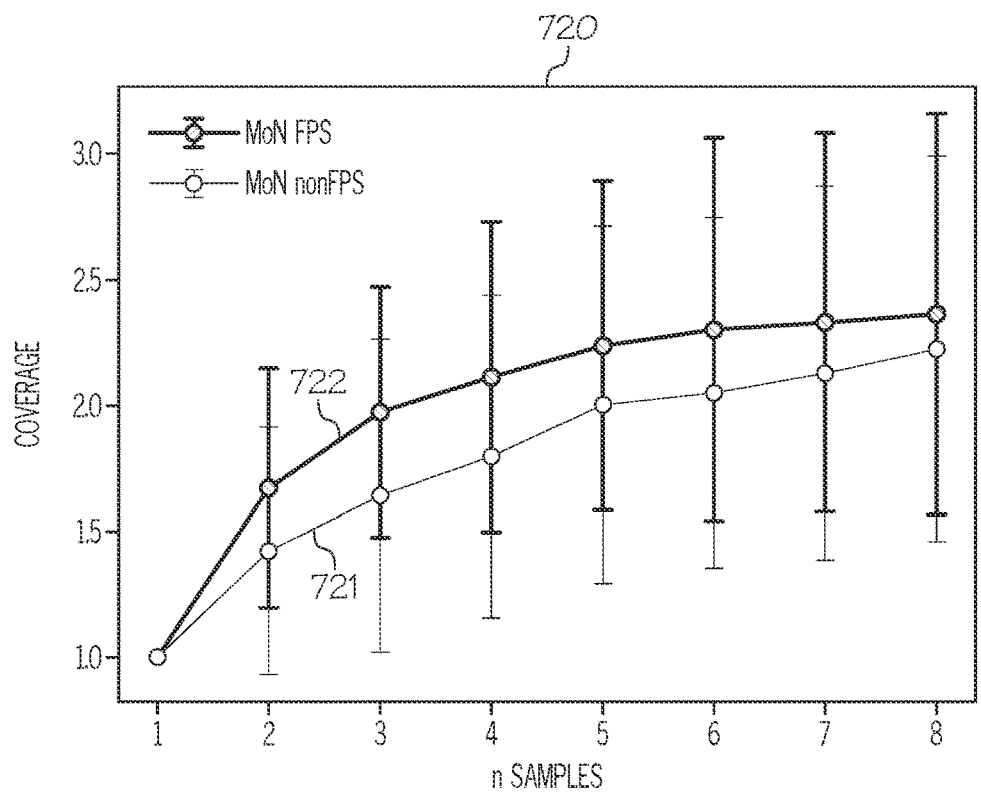

FIG. 7 depicts graphs showing accuracy and coverage of predicted vehicle trajectories generated by systems and methods according to one or more embodiments shown and described herein. Because the latent semantic space of $Z_H$ is separated from other information about the trajectory, shaped by the annotation coding 210, and sampled using farthest point sampling, the predicted vehicle trajectories provide improved coverage of realistic trajectory possibilities while maintaining state of the art accuracy.

The top graph 710 in FIG. 7 illustrates average displacement error (ADE), one measure of accuracy that may be used for evaluating the accuracy of vehicle trajectory predictions. The y-axis represents ADE and the x-axis represents a number of samples used. According to some embodiments, the number of samples may comprise the samples taken from the set of predicted trajectories, as represented in the latent space of $Z_H$. The "MoN FPS" trace 712 represents ADE for farthest point sampling (FPS), while the "MoN nonFPS" trace 711 represents ADE for direct sampling. As illustrated in the ADE graph 710, FPS outperforms direct sampling in terms of average displacement error. The gap between two traces 711, 712 indicates improved accuracy when using FPS, especially when N is from 2 to 6 samples.

The bottom graph 720 in FIG. 7 illustrates a coverage comparison between FPS and direct sampling, where the y-axis measures the number of distinct discrete label codings extracted from the predicted trajectories and the x-axis represents a number of samples used. According to some embodiments, the number of samples may comprise the samples taken from the set of predicted trajectories, as represented in the latent space of $Z_H$. The "MoN nonFPS" trace 721 represents coverage for direct sampling, while the "MoN FPS" trace 722 represents coverage for FPS. The gap between the two traces 711, 712 indicates that FPS achieves better coverage of prediction options with fewer samples than direct sampling. For example, the coverage achieved using FPS at 2 samples is better than the coverage achieved by direct sampling at 3 samples. Further, the coverage achieved using FPS at 5 samples is better than the coverage achieved by direct sampling, at 6, 7, or even 8 samples. Based on the illustrations and description of FIG. 7, a person of ordinary skill in the art will understand how accuracy and coverage may be improved using the systems and methods described herein.

Figure 8:
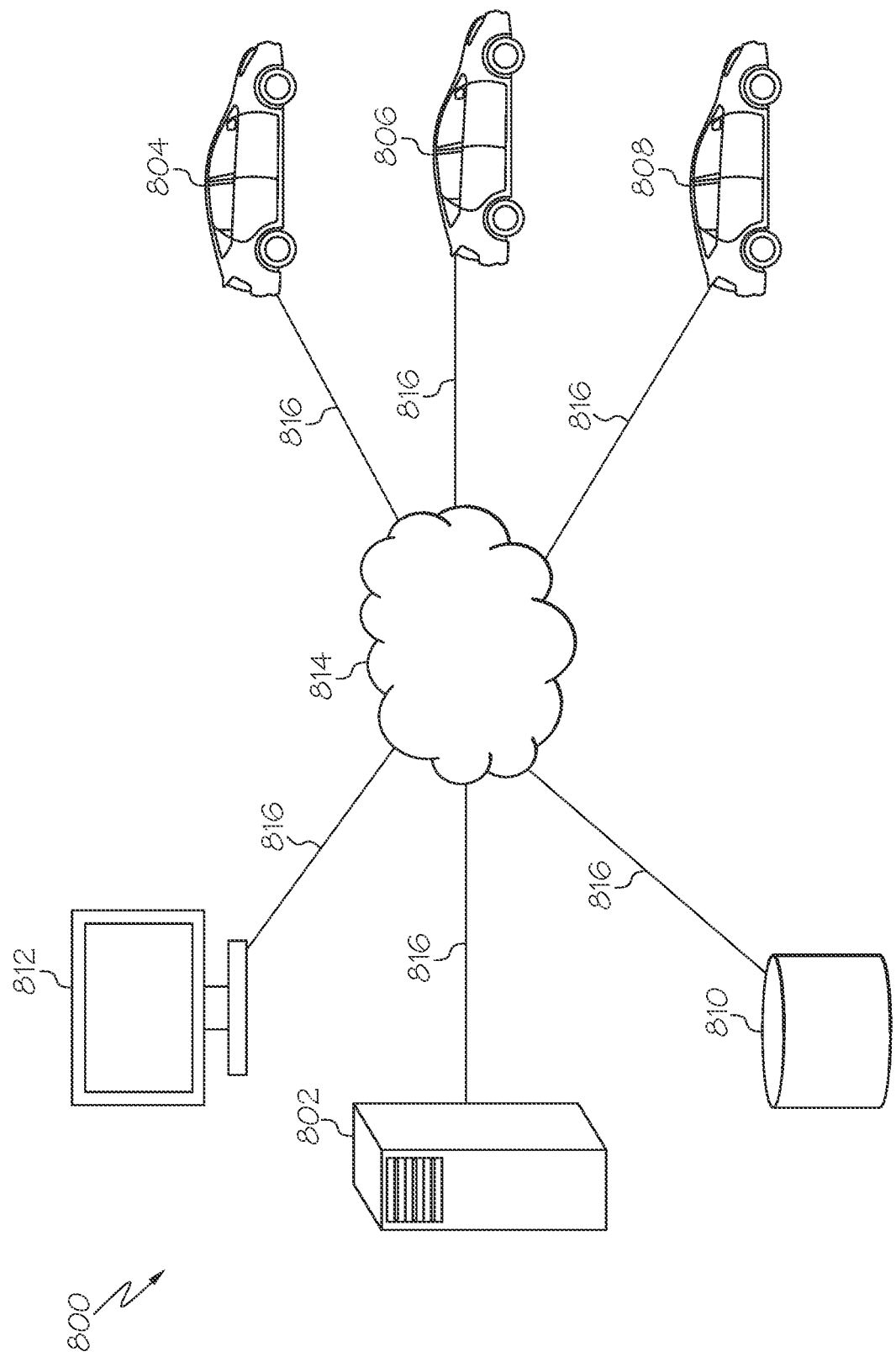
FIG. 8 depicts a vehicle trajectory prediction system, according to one or more embodiments shown and described herein.

FIG. 8 depicts a vehicle trajectory prediction system, according to one or more embodiments shown and described herein. As shown, a system 800 includes a training device 802, vehicles 804, 806, and 808, a database server 810, and a user terminal 812, each of which are communicatively connected via a network 814 and respective communication links 816 to network 814. It should be understood that system 800 could include different and/or additional entities.

Training device 802 could take the form of a mainframe, a workstation, a terminal, a personal computer, a virtual machine, or any combination of these or other training devices configured to carry out the training-device functions described herein. Though system 800 is shown as including a single training device, it should be understood that the system could include multiple training devices.

Vehicle 804 could take the form of an autonomous vehicle, a semi-autonomous vehicle, or a manually-operated vehicle, among other possibilities. The vehicle could include a computing device configured to carry out the vehicle functions or the prediction functions described herein. Either or both of vehicle 806 and 808 could take a form similar to that of vehicle 804.

Database server 810 could take the form of a database management system (DBMS) such as a relational or non-relational DBMS, a server computing device, a cloud-computing device, or any combination of these or other databases, and may be configured to store one or more observed vehicle trajectories, as examples.

User terminal 812 may be any component capable of carrying out the user-terminal functions described herein, and could take the form of (or include) a workstation, a terminal, a personal computer, a tablet device, a smartphone, or any combination of these, as just a few examples. The user terminal may include a user interface configured to output information to a user and/or receive input from the user. In an embodiment, user terminal 82 is configured to present output, received from a computing device (such as training device 802) via the user interface. In a further embodiment, the user terminal is configured to provide input, received via the user interface, to the computing device. The output may be received (and/or the input provided) over network 814 via one or more communication links 816. User terminal 812 may take other forms as well.

Network 814 may include one or more systems and network infrastructure configured to facilitate communication between any one or more of training device 802, vehicles 804, 806, and 808, database server 810, and user terminal 812. The network may take the form of (or include) one or more Wide-Area Networks (WANs), Local-Area Networks (LANs), the Internet, cellular networks, wired networks, wireless networks, or any combination of these or other networks. Network 814 may operate according to one or more communication protocols such as Ethernet, WiFi, IP, TCP, or LTE, as examples. Though the network is shown as a single network, it should be understood that the network may include multiple, distinct networks that are communicatively linked. The network could take other forms as well. Additionally, the communication links may include one or more intermediate paths or systems, for example.

Communication links 816 may communicatively link respective entities with network 814 to facilitate communication between entities communicatively connected to the network, and could take the form of one or more wired and/or wireless communication links. Any of communication links 816 may be a combination of hardware and/or software, perhaps operating on one or more communication-link layers such as one or more physical, network, transport, and/or application layers.

It should be understood that system 800 may include different and/or additional entities. For example, though system 800 is shown as including vehicles 804, 806, and 808, it should be understood that system 800 may include additional or fewer vehicles. Moreover, one or more communication links may be absent, such as one or more communication links between network 814 and vehicles 804, 806, and 808. In some embodiments, database server 810 and/or user terminal 812 are absent, or the functions of one or both of these entities are combined into another device. Other variations are possible as well.

Figure 9:
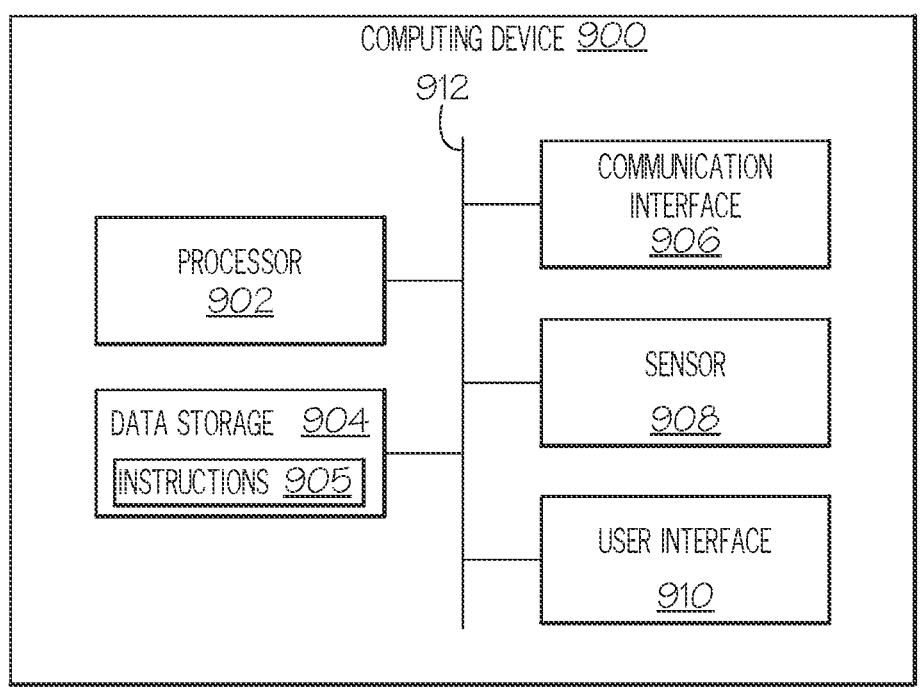
FIG. 9 depicts a block diagram of a computing device, according to one or more embodiments shown and described herein.

FIG. 9 depicts a block diagram of a computing device, according to one or more embodiments shown and described herein. As shown, a computing device 900 may include a processor 902, and data storage 904 including instructions 905. The computing device may further include a communication interface 906, a sensor 908, and a user interface 910, each of which are communicatively connected via a system bus 912. Training device 802, vehicles 804, 806, or 808, database server 810, user terminal 812, any other entity of system 800, or any combination of these could take the form of (or include) computing device 900. It should be understood that computing device 900 may include different and/or additional components, and some or all of the functions of a given component could instead be carried out by one or more different components. Additionally, computing device 900 could take the form of (or include) a plurality of computing devices, and some or all of the functions of a given component could be carried out by any combination of one or more of the computing devices in the plurality.

Processor 902 may take the form of one or more general-purpose processors and/or one or more special-purpose processors, and may be integrated in whole or in part with data storage 904, communication interface 906, sensor 908, user interface 910, and/or any other component of computing device 900, as examples. Accordingly, processor 902 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 904 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 905 may be stored in data storage 904, and may include machine-language instructions executable by processor 902 to cause computing device 900 to perform the computing-device functions described herein. Additionally or alternatively, instructions 905 may include script instructions executable by a script interpreter configured to cause processor 902 and computing device 900 to execute the instructions specified in the script instructions. In an embodiment, the instructions include instructions executable by the processor to cause the computing device to execute an artificial neural network. It should be understood that instructions 905 may take other forms as well.

Additional data may be stored in data storage 904, such as observed vehicle trajectories, indicated similarities and/or classifications of observed vehicle trajectories, an intermediate space of intermediate representations of observed vehicle trajectories, and/or network parameters of a neural network, as will be described in further detail below. The additional data could be stored such as a table, a flat file, data in a filesystem of the data storage, a heap file, a B+ tree, a hash table, a hash bucket, or any combination of these, as examples.

Communication interface 906 may be any component capable of performing the communication-interface functions described herein, including facilitating wired and/or wireless communication between computing device 900 and another entity (such as an entity of system 800). As such, communication interface 906 could take the form of an Ethernet, Wi-Fi, Bluetooth, and/or USB interface, among many other examples. Communication interface 906 may receive data over network 814 via communication links 816, for instance.

Sensor 908 could take the form of one or more sensors operable to perform any of the sensor functions described herein, including one or more sensors operable to acquire a trajectory of a road agent (such as any one or more of vehicles 804, 806, and 808), for example. The sensor could be positioned on an entity of system 800, including an interior and/or exterior of a vehicle (such as vehicles 804, 806, and/or 808). Though sensor 908 may be referenced in the singular throughout this disclosure, it should be understood that sensor 908 may take the form of (or include) a single sensor or multiple sensors.

The sensor could include a radar sensor, a lidar sensor, a camera, an accelerometer, a speedometer, or any combination of these or other sensors. The radar sensor, lidar sensor, and/or camera may obtain signals (such as electromagnetic radiation) that can be used by computing device 900 to obtain information regarding a road agent and/or other objects in an environment of a vehicle or other entity of system 800. For example, the radar sensor and/or lidar sensor may send a signal (such as pulsed laser light or radio waves) and may obtain a distance measurement from the sensor to the surface of a road agent or other object based on a time of flight of the signal—that is, the time between when the signal is sent and when the reflected signal (reflected by the object surface) is received by the sensor. The camera may collect light or other electromagnetic radiation and may generate an image representing a trajectory of a road agent or an environment of a system entity based on the collected radiation. Additionally or alternatively, the accelerometer and the speedometer may be used to detect an acceleration and a speed of a road agent, respectively. Sensor 908 may take other forms as well.

User interface 910 may be any component capable of carrying out the user-interface functions described herein. For example, the user interface may be configured to receive input from a user and/or output information to the user. Output may be provided via a computer monitor, a loudspeaker (such as a computer speaker), or another component of (or communicatively linked to) computing device 900. User input might be achieved via a keyboard, a mouse, or other component communicatively linked to the computing device. As another possibility, input may be realized via a touchscreen display of the computing device in the form of a smartphone or tablet device. Some components may provide for both input and output, such as the aforementioned touchscreen display. It should be understood that user interface 910 may take numerous other forms as well.

System bus 912 may be any component capable of performing the system-bus functions described herein. In an embodiment, system bus 912 is any component configured to transfer data between processor 902, data storage 904, communication interface 906, sensor 908, user interface 910, and/or any other component of computing device 900. In an embodiment, system bus 912 includes a traditional bus as is known in the art. In other embodiments, system bus 912 includes a serial RS-232 communication link, a USB communication link, and/or an Ethernet communication link, alone or in combination with a traditional computer bus, among numerous other possibilities. In some examples, system bus 912 may be formed from any medium that is capable of transmitting a signal, such as conductive wires, conductive traces, or optical waveguides, among other possibilities. Moreover, system bus 912 may be formed from a combination of mediums capable of transmitting signals. The system bus could take the form of (or include) a vehicle bus, such as a local interconnect network (LIN) bus, a controller area network (CAN) bus, a vehicle area network (VAN) bus, or any combination of these or mediums. It should be understood that system bus 912 may take various other forms as well.

As shown in the drawings and detailed description, systems and methods for generating predicted vehicle trajectories may be implemented using a generative adversarial network (GAN). The GAN may receive a vehicle trajectory and map information. The vehicle trajectory and map information may be received as a vehicle trajectory vector and a map vector. The GAN may use the vehicle trajectory, the map information, and noise vectors to generate a set of latent state vectors.

The latent state vectors comprise a high level portion, $Z_H$, comprising high-level information about vehicle maneuvers such as turning or changing lanes, and a low-level portion, $Z_L$, comprising fine details of a trajectory. The GAN encourages $Z_H$ and $Z_L$ to be uncorrelated, in order to keep high level information in the $Z_H$ portion of the latent state vector, and encourages $Z_H$ to be correlated with an annotation coding. The annotation coding may comprise semantic information about trajectories, which shapes the latent space of $Z_H$ according to the semantic information encoded in the annotation coding. Semantic information may be obtained from a label source identifying semantic categories of different vehicle trajectories. In the latent space of $Z_H$ shaped by the annotation coding, distances between vectors corresponding to semantically similar vehicle trajectories are smaller than distances between vectors corresponding to semantically different vehicle trajectories. Thus, the annotation coding may translate semantics into distances in the latent space of $Z_H$.

The GAN may sample from the set of latent state vectors using farthest point sampling (FPS) on the latent space of $Z_H$. FPS encourages increased distance between samples in comparison to direct sampling. Because the latent space of $Z_H$ is shaped by the annotation coding such that distance corresponds to semantically different trajectories, FPS encourages the samples taken from the latent space of $Z_H$ to cover distinct semantic categories of vehicle trajectories. The latent semantic space of $Z_H$ and FPS produce a subset of predicted trajectories that provides improved coverage of possible trajectories while maintaining state-of-the art accuracy.

In addition to prediction, the systems and methods described herein may produce behavior samples for simulation and verification. Verification of safety properties for a given driving strategy may, in some instances, be based on numerous simulations using predictive models instantiated over a large sampling space of initial agent conditions, road configurations, weather conditions, and/or social context. A semantically-meaningful, low-dimensional latent space may provide efficient sampling of possible behaviors to find rare events that affect safety (e.g. collisions between cars) with fewer simulations. The latent state may facilitate interpretation of the artificial neural network. By tuning the high-level latent state, samples may cover human intuition about diverse outcomes.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for generating a predicted vehicle trajectory comprising:
 receiving a trajectory vector of a target vehicle;
 generating a set of latent state vectors using the received trajectory vector and an artificial neural network, wherein the latent state vectors each comprise a high-level representation, $Z_H$, correlated to an annotation coding representing semantic categories of vehicle trajectories;
selecting a subset, from the set of latent state vectors, using farthest point sampling;
generating a predicted vehicle trajectory based on the subset of latent state vectors; and
controlling a vehicle based on the predicted vehicle trajectory.

2. The method of claim 1, further comprising:
selecting the subset, from the set of latent state vectors, using farthest point sampling on the high-level representation, $Z_H$;
weighting each latent state vector in the subset with a Voronoi cell weight; and
generating the predicted vehicle trajectory based on the weighted subset.

3. The method of claim 2, wherein the generating of the set of latent state vectors comprises:
receiving a map vector comprising at least one point corresponding to a road lane;
generating an intermediate vector using a first recurrent neural network on the trajectory vector and the map vector;
generating a noise vector from a normal distribution; and
generating a latent state vector using a linear layer neural network on the intermediate vector and the noise vector.

4. The method of claim 3, further comprising:
generating the predicted vehicle trajectory using a second recurrent neural network on the map vector and a weighted latent state vector in the subset.

5. The method of claim 3, wherein the latent state vectors each further comprise a low-level representation, $Z_L$; and
wherein the generating of the latent state vector comprises encouraging the high-level representation, $Z_H$, and the low-level representation, $Z_L$, to be uncorrelated.

6. The method of claim 5, further comprising:
encouraging the high-level representation, $Z_H$, to be correlated with the annotation coding such that differences between latent state vectors associated with the same annotation coding are smaller than differences between latent state vectors associated with different annotation codings.

7. The method of claim 6, wherein the encouraging of the high-level representation, $Z_H$, and the low-level representation, $Z_L$, to be uncorrelated comprises using a latent space regularization loss;
wherein the encouraging of the high-level representation, $Z_H$, to be correlated with the annotation coding comprises using an embedding loss; and
using a discriminator to generate a loss signal for the generated predicted vehicle trajectory, wherein the loss signal comprises the latent space regularization loss and the embedding loss.

8. A non-transitory computer-readable storage medium comprising instructions that, when executed by a processor, cause the processor to perform the steps of:
receiving a trajectory vector of a target vehicle;
generating a set of latent state vectors using the received trajectory vector and an artificial neural network, wherein the latent state vectors each comprise a high-level representation, $Z_H$, correlated to an annotation coding representing semantic categories of vehicle trajectories;
selecting a subset, from the set of latent state vectors, using farthest point sampling;
generating a predicted vehicle trajectory based on the subset of latent state vectors; and
controlling a vehicle based on the predicted vehicle trajectory.

9. The non-transitory computer-readable storage medium of claim 8, further comprising instructions that when executed by a processor, cause the processor to further perform steps comprising:
selecting the subset, from the set of latent state vectors, using farthest point sampling on the high-level representation, ZH;
weighting each latent state vector in the subset with a Voronoi cell weight; and
generating the predicted vehicle trajectory based on the weighted subset.

10. The non-transitory computer-readable storage medium of claim 9, wherein the generating of the set of latent state vectors comprises:
receiving a map vector comprising at least one point corresponding to a road lane;
generating an intermediate vector using a first recurrent neural network on the trajectory vector and the map vector;
generating a noise vector from a normal distribution; and
generating a latent state vector using a linear layer neural network on the intermediate vector and the noise vector.

11. The non-transitory computer-readable storage medium of claim 10, further comprising instructions that when executed by a processor, cause the processor to further perform steps comprising:
generating the predicted vehicle trajectory using a second recurrent neural network on the map vector and a weighted latent state vector in the subset.

12. The non-transitory computer-readable storage medium of claim 10, wherein the latent state vectors each further comprise a low-level representation, $Z_L$; and
wherein the generating of the latent state vector comprises encouraging the high-level representation, $Z_H$, and the low-level representation, $Z_L$, to be uncorrelated.

13. The non-transitory computer-readable storage medium of claim 12, further comprising instructions that when executed by a processor, cause the processor to further perform steps comprising:
encouraging the high-level representation, $Z_H$, to be correlated with the annotation coding such that differences between latent state vectors associated with the same annotation coding are smaller than differences between latent state vectors associated with different annotation codings.

14. The non-transitory computer-readable storage medium of claim 13, further comprising instructions that when executed by a processor, cause the processor to further perform steps comprising:
using a latent space regularization loss to encourage the high-level representation, $Z_H$, and the low-level representation, $Z_L$, to be uncorrelated;
using an embedding loss to encourage the high-level representation, $Z_H$, to be correlated with the annotation coding; and
using a discriminator to generate a loss signal for the generated predicted vehicle trajectory, wherein the loss signal comprises the latent space regularization loss and the embedding loss.

15. A computing device comprising:
a processor; and
a memory storing instructions that, when executed by the processor, cause the computing device to:
receive a trajectory vector of a target vehicle;
generate a set of latent state vectors using the received trajectory vector and an artificial neural network, wherein the latent state vectors each comprise a high-level representation, $Z_H$, correlated to an annotation coding representing semantic categories of vehicle trajectories;
select a subset, from the set of latent state vectors, using farthest point sampling;
generate a predicted vehicle trajectory based on the subset of latent state vectors; and
control a vehicle based on the predicted vehicle trajectory.

16. The computing device of claim 15, wherein the memory further comprises instructions that, when executed by the processor, further cause the computing device to:
select the subset, from the set of latent state vectors, using farthest point sampling on the high-level representation, $Z_H$;
weight each latent state vector in the subset with a Voronoi cell weight; and
generate the predicted vehicle trajectory based on the weighted subset.

17. The computing device of claim 16, wherein the generating of the set of latent state vectors comprises:
receiving a map vector comprising at least one point corresponding to a road lane;
generating an intermediate vector using a first recurrent neural network on the trajectory vector and the map vector;
generating a noise vector from a normal distribution; and
generating a latent state vector using a linear layer neural network on the intermediate vector and the noise vector.

18. The computing device of claim 17, wherein the non-transitory computer-readable storage medium further comprises instructions that, when executed by the processor, further cause the computing device to:
generate the predicted vehicle trajectory using a second recurrent neural network on the map vector and a weighted latent state vector in the subset.

19. The computing device of claim 17, wherein the latent state vectors each further comprise a low-level representation, $Z_L$; and
wherein the generating of the latent state vector comprises encouraging the high-level representation, $Z_H$, and the low-level representation, $Z_L$, to be uncorrelated.

20. The computing device of claim 19, wherein the non-transitory computer-readable storage medium further comprises instructions that, when executed by the processor, further cause the computing device to:
encourage the high-level representation, $Z_H$, to be correlated with the annotation coding such that differences between latent state vectors associated with the same annotation coding are smaller than differences between latent state vectors associated with different annotation codings.

* * * * *